Oct. 12, 1965         R. W. KAASE ET AL         3,211,447
APPARATUS FOR HOLDING FIN MEMBERS DURING BONDING
Filed Sept. 19, 1962                    3 Sheets-Sheet 3
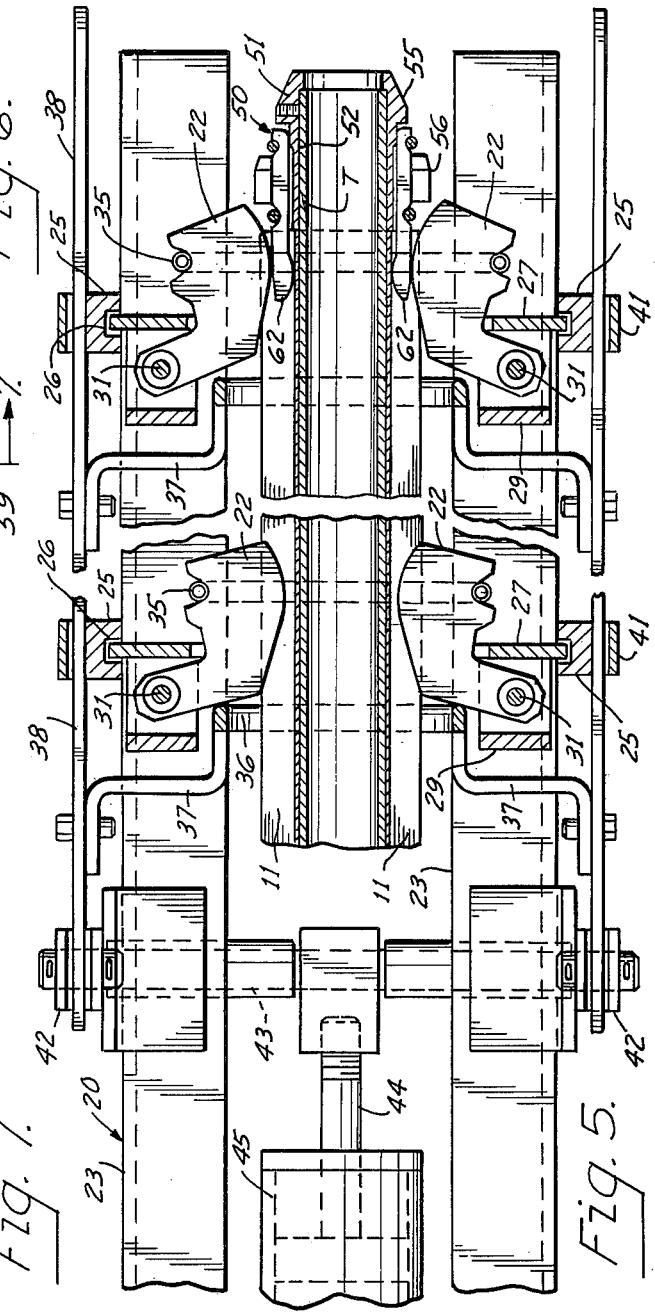
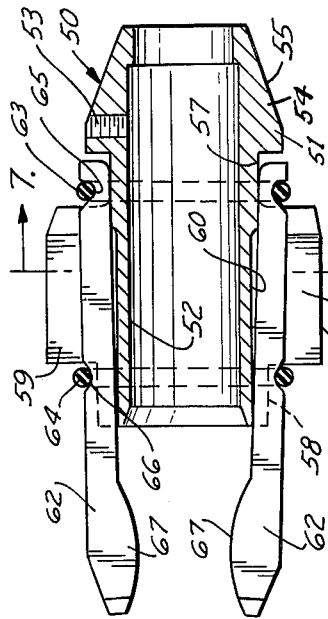
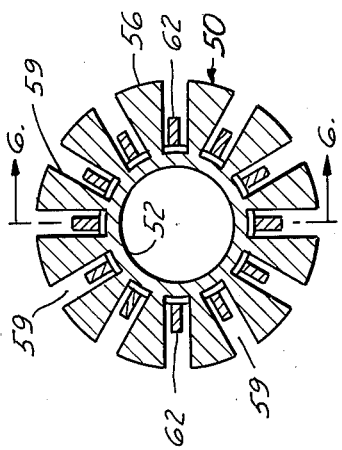
INVENTORS
ROBERT W. KAASE &
OSCAR W. JALAVA
BY Bosworth, Sessions,
Herrstrom & Knowles
ATTORNEYS.

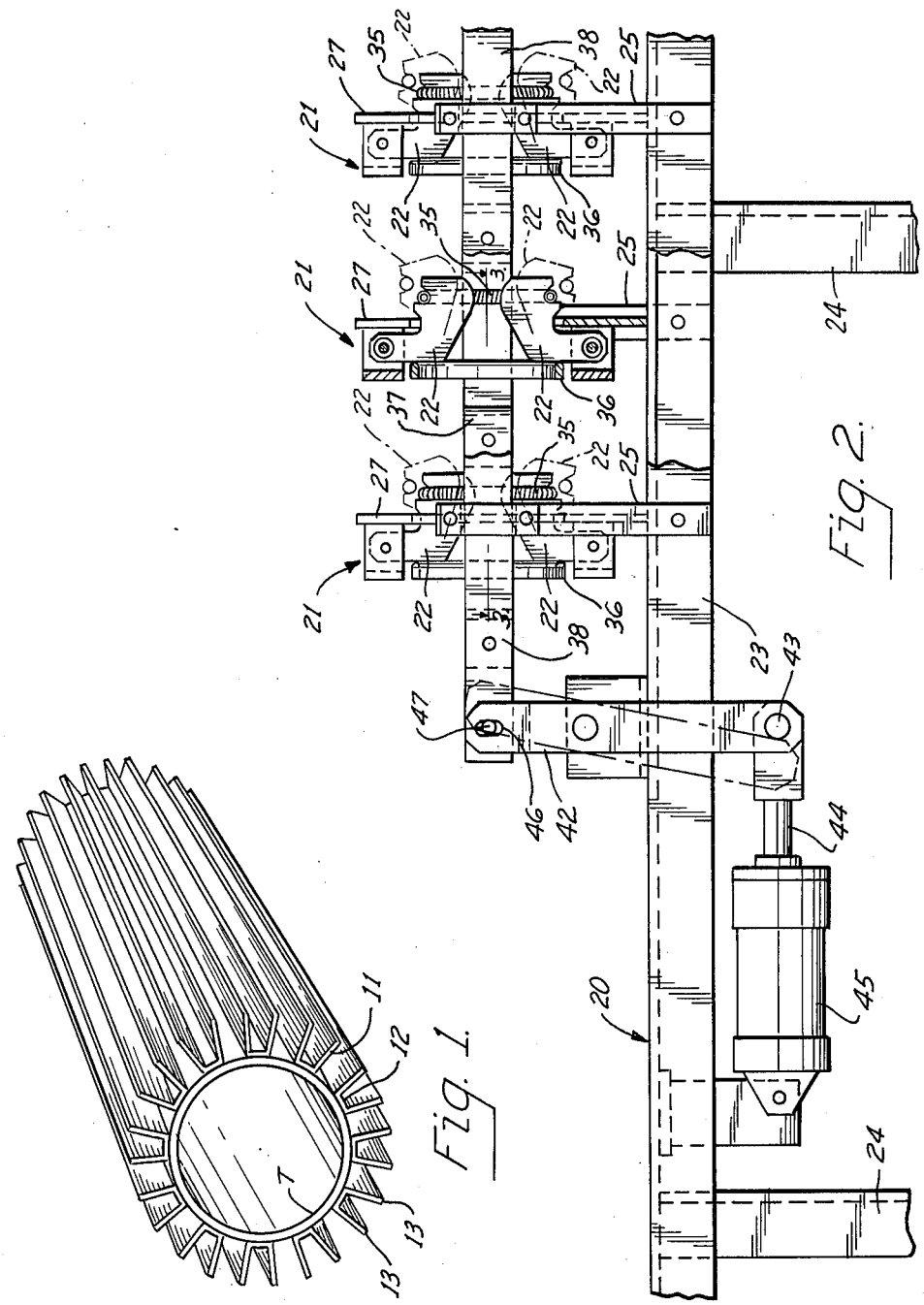

United States Patent Office 3,211,447
Patented Oct. 12, 1965

3,211,447
APPARATUS FOR HOLDING FIN MEMBERS
DURING BONDING
Robert W. Kaase, Bay Village, and Oscar W. Jalava, Elyria, Ohio, assignors to Brown Fintube Company, Elyria, Ohio, a corporation of Ohio
Filed Sept. 19, 1962, Ser. No. 224,621
9 Claims. (Cl. 269—153)

This invention relates to the manufacture of heat exchanger tubes having external fins, and more particularly to apparatus for bonding longitudinally extending fins to the exterior of heat exchanger tubes by a bonding metal that is fused in the bonding operation. This type of bonding is hereinafter referred to as "brazing" and the term "brazing" as used herein is intended to cover bonding methods ordinarily known as soldering, silver soldering, brazing, copper brazing, hydrogen brazing, and the like.

Heat exchanger tubes having external longitudinally extending generally radially disposed fins are used for many purposes, but heretofore the manufacture of such tubes on which the longitudinally extending external fins have been brazed to the tubes usually has required either rather expensive equipment for holding the fins on the tubes during the brazing operation or has required considerable manual labor and time, with resulting expense.

For maximum heat transfer between the fins and the tube, the joints between the fins and the tube should be completely filled with metal and there should be no gaps or discontinuities in the metal structure between the fins and the tube. In order to provide such a desired joint, it is necessary that the surfaces to be joined be held firmly in contact with brazing metal between the surfaces while brazing heat is applied to cause the brazing metal to melt and completely fill all spaces between the surfaces to be joined. It is difficult thus to hold separate longitudinally extending fin members, because of their length and because they must be properly spaced from each other and individually held. The difficulty of holding such fin members in place against the exterior of a tube is accentuated because the fin members themselves may not be very accurate in shapes or dimensions throughout their lengths, because the tubing itself may not be of uniform diameter or roundness throughout its length, and because the tube and fin members tend to change size and shape on being heated to and cooled from brazing temperatures. Seamless tubing, which is used widely in heat exchangers, ordinarily is slightly oval rather than perfectly round in cross section, and the major diameters of the oval cross sections do not lie in one plane extending longitudinally of the tube, but usually lie in a spiral path along the length of the tube so that a longitudinal element of the tube is not a straight line but an undulating or curved line. A straight longitudinal fin cannot be successfully brazed to such a surface throughout the joint area of the fin and the tube unless the fin is deformed slightly to cause it to bear firmly against the undulating outer surface of the tube. The difficulty of holding the fins in place against the tube is, of course, increased if the fins themselves are inaccurate.

Any apparatus for mechanically holding the fins in place on the tube must not only firmly and accurately hold the fins in place despite their inaccuracies and distortion, but should not itself abstract sufficient heat from the tube or fins during the brazing operation to prevent formation of a satisfactory bond.

A general object of the invention, therefore, is to provide an improved apparatus for brazing longitudinally extending fin members to the exterior of tubes. Another object is the provision of such apparatus which makes possible substantial savings in time and labor. Another object is the provision of apparatus that permits easy and rapid loading of the tube and the fins to be brazed, holds the fins firmly and accurately in place during the brazing operation to provide conditions facilitating formation of a good brazed bond, and permits easy and rapid removal of the completed brazed finned tube from the apparatus. A further object is the provision of apparatus whereby longitudinally finned heat exchanger tubes of excellent heat exchange characteristics can be produced rapidly and at reasonable costs. Further objects and advantages of the invention will become apparent from the following description of a preferred form thereof, reference being made to the accompanying drawings in which:

FIGURE 1 is a perspective of a section of finned tubing made according to the present invention;

FIGURE 2 is a side elevation, to a smaller scale, of a portion of apparatus embodying the invention, parts being broken away for clearness, the fin-member holding fingers being shown in full lines in their innermost positions ready to receive a tube and fin members, and in broken lines in retracted positions;

FIGURE 5 is a plan section generally corresponding to that of FIGURE 3 and to the same scale, but showing how an assembly of a tube and a set of unbonded channel-shaped finned members may be inserted into the apparatus;

FIGURE 6 is a longitudinal sectional elevation along line 6—6 of FIGURE 7, to a scale larger than that of FIGURES 3 to 5 inclusive, of one form of fin-holding loading guide which may be used to facilitate loading of a tube and a set of unbonded fin members into the apparatus; and FIGURE 7 is a section along line 7—7 of FIGURE 6.

Figure 3:
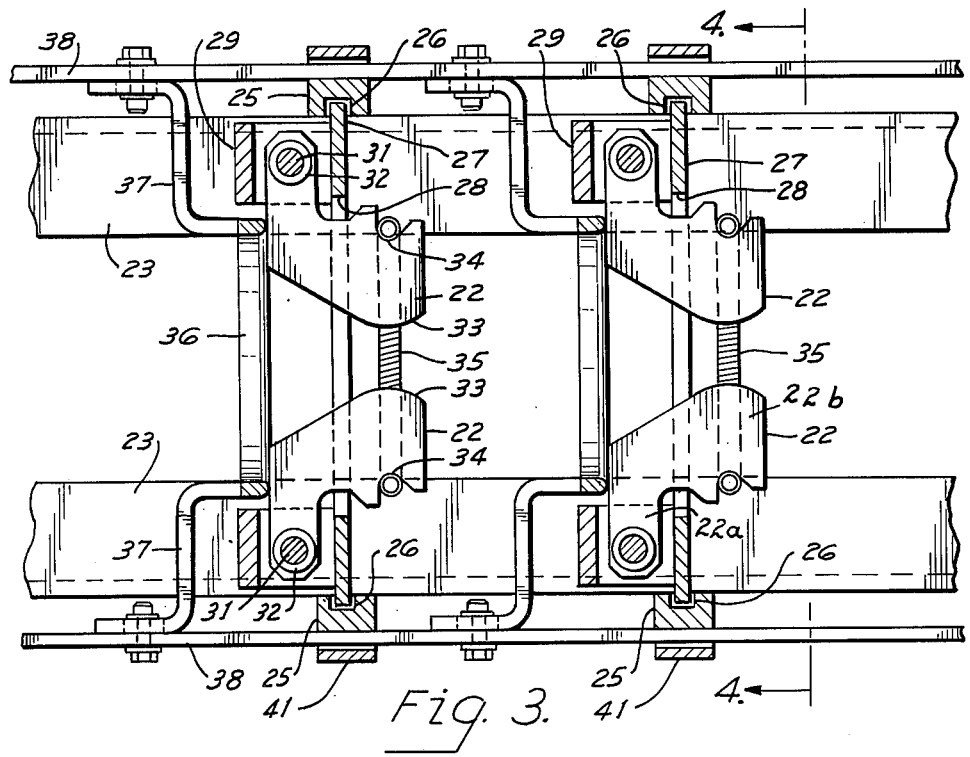
FIGURE 3 is a sectional elevation along line 3—3 of FIGURE 2, but to an enlarged scale.

Briefly, our invention provides an apparatus for holding a set of a predetermined number of channel section, longitudinally extending, fin members in place against a tube during a brazing operation, which apparatus includes several sets of finger members which locate the fin members and press them against the outer surface of the tube. The finger members have bearing portions which contact the inner bottom and side surfaces of the channel-sectioned fin members at several points along their lengths to press each fin member against the tube and locate it transversely of the tube. The finger members of each set are independently radially movable toward and away from the axis of the tube so that their bearing portions can define circular peripheries of different diameters or non-circular peripheries of various shapes and sizes. The finger members of each set are resiliently urged toward the axis of the tube when operating to hold the fin members in place, and are also positively movable radially away from the axis of the tube to permit rapid and easy loading of an assembly of a tube and a set of fin members to be brazed, and facilitate easy and rapid removal of the finned tube after brazing.

The portions of the fin members that engage the tube may be tinned with bonding metal, or bonding metal may be wound in strip form around the tube, before the fin members are held against the tube. Flux is applied to the surfaces to be joined. The assembly, made up of the tube and the fin members held in place on the tube by the sets of finger members, is then heated, for example by moving a gas fired or electrically heated heating element within the tube and heating the tube incrementally from within to melt the bonding metal, and then permitting the heated increments to cool to solidify the bonding metal. The fused and solidified bonding metal firmly joins the fin members onto the outer surface of the tube throughout their abutting areas. Thereafter the bearing portions of finger members of the various sets are caused to move radially away from the axis of the tube to permit ready removal of the brazed finned tube.

As shown in FIGURE 1 of the drawings, a finned tube made according to the preferred form of the invention may comprise a tube T to which a number of fin members 11 are brazed. In this form of the invention the fin members are shown as being of channel or U-section, each fin member comprising a substantially flat base portion 12 that is brazed to the exterior of the tube and two fin portions 13 formed integrally with the base portion. The base portions and fins of the fin members preferably are of substantially the same thickness, and after a proper brazing operation the base portions conform closely to the exterior of the tube throughout a substantial portion of their width and throughout their lengths and are joined to the tube by a continuous metal bond. As indicated in the drawing, the tube T may have a wall thickness substantially greater than the wall thickness of the fin members.

The apparatus illustrated in FIGURES 2–5, inclusive, as embodying the invention comprises a generally horizontal frame 20 supporting along its length at suitably spaced intervals a plurality of sets 21 of finger members 22. The frame 20 comprises two transversely spaced horizontally extending L-section beams 23 supported by legs 24. The sides of the beams 23 carry upwardly extending side supporting members 25 each of which has a vertical inwardly facing upwardly open groove 26, shown in FIGURES 3, 4 and 5.

Each set 21 of fingers comprises an upwardly extending supporting plate 27 having side edges engaging the grooves 26 of members 25 and a bottom edge which rests on the beams 23. The supporting plate has a central opening 28, preferably circular. Fixed to one side of plate 27 around this opening are a number of slotted supporting members 29, equal in number to the channel section fin members to be brazed onto the tube. Each supporting member 29 has a radially extending slot 30 in which one of the finger members 22 is pivotally supported about a pivot pin 31 and located transversely by spacers 32. The axes of all pivot pins for a set of fingers lie in a common plane essentially perpendicular to the axis of the tube when it is in place in the apparatus, and all pivot axes are tangential to a circle having its center essentially on the tube axis; the points of tangency, and hence the pivot points of the fingers, are thus equiangularly and equidistantly spaced around the center of said circle, which center is located on the work axis of the apparatus with which the tube axis is essentially coincident.

Figure 4:
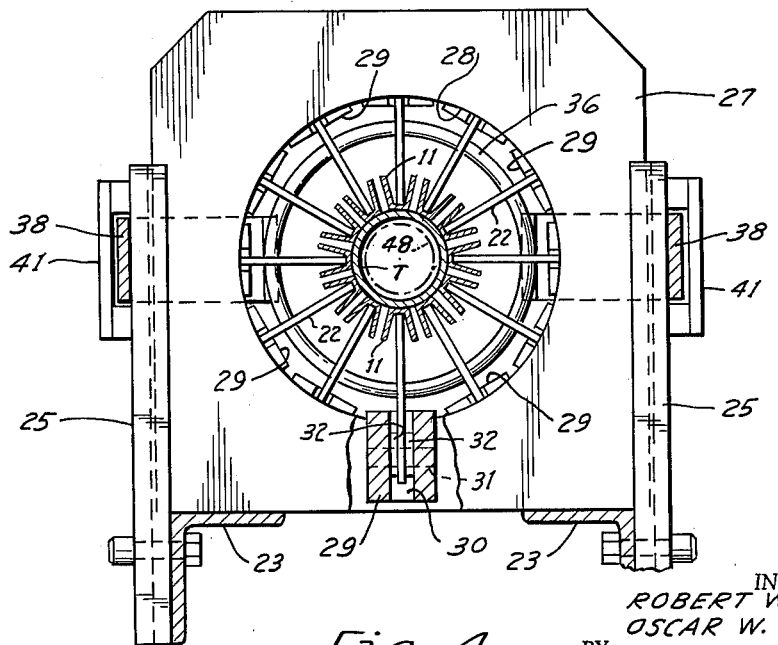
FIGURE 4 is a vertical sectional elevation, generally corresponding to line 4—4 of FIGURE 3 and to the same scale, but showing in cross section fin members held in place on a tube during a brazing operation.

All finger members 22 are identical in shape, each having the general shape of a bell crank lever having a substantially radial end portion 22a by which it is pivotally supported, and having a substantially axial end portion 22b carrying a bearing portion 33 (FIGURE 3). Bearing portion 33 extends and faces radially inwardly toward the work axis along which the tube axis is located, and is shaped to engage the base portion 12 and fins 13 of a fin member 11 to press it against the outer surface of the tube T and locate it transversely, as shown in FIGURE 4. Preferably, as shown in FIGURE 3 the bearing portion 33 of each finger member is longitudinally curved so it can engage the lower inner portion of a fin member over a wide range of angular positions of the finger member, as is apparent from FIGURE 2. The outer surfaces of the substantially radial portions 22b of the finger members of each set have notches 34 carrying a garter spring 35 which normally resiliently independently urges the bearing portions 33 of the finger members radially inwardly toward the axis of a tube carried between the finger members.

The illustrated apparatus also includes means for positively moving the finger members 22 of each set 21 radially away from the axis of the tube when desired, such means including an annular bearing member 36 located so that when moved generally horizontally it engages the substantially radial portions 22a of the finger members and positively pivotally moves them against the resistance provided by the garter spring 35. The annular bearing member 36 is supported and moved in the desired generally horizontal path by brackets 37 fixed to horizontally disposed and horizontally movable bars 38. These bars are slidably supported in pocket members 41 bolted to the outer sides of the upwardly extending side members 25, and, as shown in FIGURES 2 and 5, are moved horizontally as desired by levers 42 pivotally mounted on the members 23 of the frame and connected through cross member 43 to the piston rod 44 of an air actuated cylinder 45. Preferably the levers 42 have slots 46 engaging pins 47 fixed to the ends of the side bars 38 to permit them to be moved in straight horizontal paths.

When the levers 42 and side bars 38 are in their extreme retracted positions, as is shown in full lines in FIGURE 2, the bearing portions 33 of the finger members 22 are in their innermost positions i.e. in the positions where they define the smallest circle possible with the particular apparatus. When the levers 42 and side bars 38 are moved to their extreme advanced positions, as is shown in broken lines in FIGURE 2, the annular bearing members 36 for all sets press against the finger members and cause the bearing portions 33 of the finger members to be in their extreme outermost positions as shown in broken lines in FIGURE 2. The finger members 22 thus may be moved to their extreme retracted positions or to any desired intermediate positions to permit loading of the tube and fin members into the sets of fingers prior to brazing, and later to permit removal of the brazed finned tube.

Since the finger members of all sets are identical and are pivotally equiangularly and equidistantly mounted as described above, each channel-shaped fin member is pressed against the tube and also properly located transversely of the tube by several finger members, one from each set. Since all finger members are independently movable relatively to each other and are independently biased inwardly, they press the fin member and locate it firmly in the desired portion against the outer surface of the tube, even though the tube or fin member is inaccurate or distorted as described above, and even though the sizes and shapes of the fin members or tube may change due to thermal expansion on heating and contraction on cooling. All fin members are thus held in the desired positions relatively to themselves and to the tube, in position for brazing, by the finger members of several sets. Brazing metal may be supplied either by previously tinning it on the portions of the fin members to be joined to the tube, or by winding a strip of brazing metal on the tube before it is placed in the apparatus with the fin members. Suitable heating means, such as the type of gas burner that supplies its own combustion air which is disclosed in U.S. Patent 2,572,593, owned by the assignee of the present application, may be passed longitudinally through the tube at a rate such that each increment of the tube is heated sufficiently to cause the brazing metal to melt and form the bond, and to become solidified as the heating element moves away. Such a heating element is shown in broken lines and designated by reference numeral 48 in FIGURE 4.

The tube and the fin members may be loaded into the apparatus entirely by hand if desired, the individual pivotal mounting of the finger members facilitating this. However, it is possible to save substantial time and labor by use of a loading guide 50 such as that shown in FIGURES 5, 6 and 7. Such guide comprises a body 51 having a bore 52 adapted to receive the bare end of a tube T to which fin members are to be brazed. A set screw 53 is provided to firmly hold the guide member 50 on the end of the tube.

Preferably the front portion 54 of the body has a frusto-conical shape 55, to facilitate movement of the guide past the finger members 22. Body 51 has a radially extending enlarged portion 56 near its rear end, a groove 57 between such portion 56 and the front portion 54 of the body, and a rear portion 58 of substantially smaller diameter than portion 56. Portion 56 has slots 59 equal in number and width to the channel-shaped fin members to be brazed, which slots extend through the enlarged portion 56 and portion 58 to the rear end of body 51. The lower portions of these slots are relieved at 60.

A longitudinally extending finger 62 is located in each slot 59, being resiliently held in place by elastic bands 63 and 64, such as a band of rubber or a garter spring located in grooves 65 and 66 in the fingers on opposite sides of the enlarged portion 56. The rear end portions of the fingers 62 have inwardly extending portions 67 to aid in gripping the base portions of the channel-shaped fin members, and the front ends of the fingers are located adjacent the shoulder on front portion 54 defining the front of groove 57. The relieved portions 60 of the slots permit the rear ends of fingers 62 to tilt inwardly better to aid in holding the fin members.

In use of the lead guide 50, the end of the bare tube T is inserted in the bore 52 of body 51 and secured by set screw 53. The fin members then are inserted between the fingers 62 and the outer surface of the tube, with their front ends abutting the rear end of guide 50, as shown in FIGURE 5. The elastic bands 63 and 64 firmly press the fingers 62 against the fins to hold them in place on the front end of the tube, the protuberances 67 and relieved slot portions 60 aiding in this. The assembly is then moved through the sets of fingers 22 from the pivoted ends of the fingers, either by pulling, but preferably by pushing the tube and fin members. Preferably the finger members 22 of the apparatus have been previously retracted to positions in which their bearing portions fit within the channel-shaped fin members but do not bear against the bottom portions thereof, as shown in FIGURE 5.

As the assembly having the lead guide 50 at its forward end is moved up to the finger members 22 of a given set 21, the frustoconical forward end 55 of guide 50 engages the finger members 22 and forces them outwardly. As the guide 50 moves further through the set of inwardly biased finger members 22, their bearing portions 33 ride over the outer surfaces of the fingers 62 and elastic bands 63 and 64 of the guide 50 and through the slots 59 until the rear ends of the fingers 62 pass under the finger members 22, after which the finger members 22 move inwardly under the force exerted by the garter spring 35. The finger members of this set, and all preceding sets through which the lead guide has passed thereafter serve to guide the following portions of the channel-shaped fin members without, however pressing against the bottom base portion. After the assembly of the tube and fin members has thus been passed through all sets of finger members 22, the air cylinder 45 is actuated to retract the side bar members 38 sufficiently to remove the annular bearing members 36 from contact with the finger members of all sets, so that all sets of finger members are urged radially inwardly by their respective garter springs to firmly hold and locate the fin members in place on the outer surface of the tube T and to support the tube T itself. The lead guide 50 preferably is removed after the fin members are thus held in place. Thereafter the brazing operation can be carried out as indicated above.

Since the tubes are held in place at spaced intervals by relatively thin finger members each of which contacts the fin members over only a small area, the apparatus can abstract only a small amount of heat during the brazing operation and hence promote formation of strong brazed joints.

It will be apparent that the apparatus can be readily adapted to the brazing of various sizes of tubes having various numbers of fins, since the sets of fingers can be readily interchanged by vertically sliding the plates 27 carrying the fingers 22, out of grooves 26 of members 25, and replacing them with other suitable sets of fingers on their own plates 27. This can be done without interference from the retraction mechanism including annular bearing members 36.

It is intended that the patent shall cover, by suitable expression in the appended claims, whatever features of patentable novelty that reside in the invention.

We claim:

1. Apparatus of the type described having a work axis and comprising a frame; a plurality of finger members, each having a bearing portion extending toward the work axis, movably supported by said frame in spaced generally radial relation around said work axis so their bearing portions can define about said axis a generally circular periphery the diameter of which may be varied by movement of the finger members to cause their bearing portions to move generally radially toward and away from said axis; resilient means operating on said finger members to urge said bearing portions toward said axis; and common means simultaneously engaging said finger members and operating to move them to cause their bearing portions to move away from said axis.

2. Apparatus of the type described having a work axis and comprising a supporting member; a plurality of finger members spaced around said axis, each of said finger members being generally of the form of a bell crank lever with a substantially radial portion and a substantially axial portion having a bearing portion extending toward said work axis, each of said finger members being pivotally mounted on said supporting member so its bearing portion is movable generally radially toward and away from said work axis; resilient means engaging the generally axial portions of said finger members to bias the bearing portions of said finger members inwardly toward said work axis; and means for engaging the generally radial portions of said finger members to positively move them to cause their bearing portions to move away from said work axis.

3. Apparatus of the type described having a work axis and comprising an elongated frame; a plurality of sets of finger members disposed in spaced relation along said frame, each of the finger members in each set having a bearing portion extending toward said work axis and being movably supported by said frame in spaced generally radial relation around said axis which is common to all sets, so their bearing portions can define about said axis a generally circular periphery the diameter of which may be varied by movement of the fingers to cause their bearing portions to move radially toward and away from said axis; resilient means operating on said finger members of each set independently of all other sets to urge said bearing portions toward said axis; and common means simultaneously engaging said finger members of each set and operating to move them to cause their bearing portions to move away from said axis.

4. Apparatus of the type described having a work axis and comprising an elongated frame; a plurality of sets of finger members disposed in spaced relation along said frame, each of the finger members in each set having a bearing portion extending toward said work axis and being movably supported by said frame in spaced generally radial relation around said axis which is common to all sets, so their bearing portions can define about said axis a generally circular periphery the diameter of which may be varied by movement of the finger members to cause their bearing portions to move radially toward and away from said axis; resilient means operating on said finger members of each set independently of all other sets to urge said bearing portions toward said axis; and means operative on said finger members of all sets to positively move them simultaneously to cause their bearing portions to move away from said axis.

5. Apparatus of the type described having a work axis and comprising a supporting member; a plurality of finger members pivotally mounted on said supporting member about pivot axes which are essentially tangent to a circle the center of which lies on said work axis, the points of tangency of said pivot axes being equiangularly spaced around said work axis, all of said finger members being identical in shape and each finger member having generally the form of a bell crank lever having a substantially radial portion by which it is pivotally mounted about one of said pivot axes and a substantially axial portion having a bearing portion extending toward said work axis; resilient means engaging the generally axial portions of all finger members to bias said bearing portions of said finger members inwardly toward said work axis; and means for engaging the generally radial portions of said finger members for positively moving said finger members so their bearing portions move away from said work axis.

6. Apparatus of the type described comprising an elongated frame having a work axis extending longitudinally thereof; a plurality of supporting members disposed in spaced relation along said frame; a set of finger members pivotally supported on each of said supporting members about a pivot axis which is essentially tangential to a circle the center of which lies on said work axis which is common to all sets of finger members, the points of tangency of said pivot axes being equiangularly spaced about said work axis, all of said finger members being identical in shape and each having the general form of a bell crank lever having a substantially radial portion by which it is pivotally mounted about said pivot axis and a substantially axial portion having a bearing portion extending toward said work axis; resilient means engaging the generally axial portions of said finger members of each set to bias the bearing portions of said finger members toward said axis; and means for simultaneously engaging the generally radial portions of all finger members of all sets to positively move them so their bearing portions move away from said axes.

7. Apparatus of the type described comprising a generally horizontally disposed elongated frame having a work axis extending longitudinally thereof; upwardly extending side supporting members fixed to said frame in pairs, said pairs being disposed at spaced intervals along said frame, and each of said pairs of side supporting members having upwardly extending upwardly open facing grooves therein; a plurality of transversely extending supporting members demountably supported in the grooves of said pairs of side supporting members on said frame; a set of finger members pivotally supported on each of said transversely supporting members about pivot axes which are essentially tangential to a circle the center of which lies on said work axis which is common to all sets of finger members, the points of tangency of said pivot axes being equiangularly spaced about said work axis, all of said finger members being identical in shape and each having generally the form of a bell crank lever having a substantially radial portion by which it is pivotally mounted about one of said pivot axes and a substantially axial portion carrying a bearing portion extending toward said work axis; endless resilient means surrounding and engaging the generally axial portions of the finger members of each set to bias the bearing portions of said finger members inwardly toward said work axis; annular bearing means surrounding said work axis for engaging the generally radial portions of the finger members of each set; and means for simultaneously moving the annular bearing means for all sets to cause them to simultaneously positively move all finger members of all sets to cause their bearing portions to move radially away from said working axis.

8. A lead guide for aiding in the insertion into a holding apparatus of an assembly made up of fin members loosely held in place on a tube to which the fin members are to be bonded, said lead guide comprising a generally cylindrical body member, a generally radially projecting portion on said body member intermediate its ends, longitudinally extending slots radially disposed in the exterior periphery of said body member and extending through said radially projecting portion, longitudinally extending elongated fingers disposed in said slots, each of said fingers having a portion extending forwardly of said radially projecting portion and an end portion projecting rearwardly of said body portion, and means resiliently holding said finger on said body portion.

9. The lead guide of claim 8 in which each of said slots is inwardly relieved from a point near its forward end to the rear of said body portion, to permit the projecting rear ends of said fingers to be tilted inwardly by said resilient means.

References Cited by the Examiner
UNITED STATES PATENTS

| | | | |
|---|---|---|---|
| 1,004,260 | 9/11 | Highee | 269—254 |
| 2,095,964 | 10/37 | Blickman | 113—99 |
| 2,768,597 | 10/56 | Smith | 113—99 |
| 2,857,661 | 8/58 | Bruegger | 113—1 |
| 2,866,648 | 12/58 | Parsons | 279—23 |
| 2,869,882 | 1/59 | Zimmerman | 279—23 |
| 3,147,018 | 8/64 | Reichert | 269—254 |

CHARLES W. LANHAM, *Primary Examiner.*